(12) United States Patent
Burnett et al.

(10) Patent No.: US 7,567,966 B2
(45) Date of Patent: Jul. 28, 2009

(54) METHOD AND APPARATUS FOR MANAGING MULTI-STREAM INPUT/OUTPUT REQUESTS IN A NETWORK FILE SERVER

(75) Inventors: Rodney Carlton Burnett, Austin, TX (US); David William Sheffield, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 430 days.

(21) Appl. No.: 11/226,968

(22) Filed: Sep. 15, 2005

(65) Prior Publication Data

US 2007/0073830 A1 Mar. 29, 2007

(51) Int. Cl.
*G06F 17/30* (2006.01)
*G06F 7/00* (2006.01)

(52) U.S. Cl. .......................................... 707/9
(58) Field of Classification Search ............. None
See application file for complete search history.

(56) References Cited

U.S. PATENT DOCUMENTS

| | | | |
|---|---|---|---|
| 5,557,770 A | 9/1996 | Bhide et al. | |
| 5,950,199 A | 9/1999 | Schmuck et al. | |
| 5,987,477 A | 11/1999 | Schmuck et al. | |
| 6,023,706 A * | 2/2000 | Schmuck et al. | 707/200 |
| 6,754,734 B2 | 6/2004 | Goode et al. | |
| 2004/0078604 A1* | 4/2004 | Rice et al. | 713/202 |
| 2004/0215746 A1 | 10/2004 | McCanne et al. | |
| 2005/0063302 A1* | 3/2005 | Samuels et al. | 370/229 |

FOREIGN PATENT DOCUMENTS

WO    0235359 A1    5/2002

OTHER PUBLICATIONS

Maddalozzo, Jr., et al. "Method of Control for Memory Segment Input/Output", IBM Technical Disclosure Bulletin, vol. 4, No. 1, Jan. 1997, pp. 155-156.
Callaghan et al., "NFS Version 3 Protocol Specification", Network Working Group Request for Comments No. 1813, Sun Microsystems, Inc., Jun. 1995, pp. 1-126.
Pawlowski et al., "The NFS Version 4 Protocol", Proceedings of 2nd International SANE Conference, May 2000, Maastricht, Netherlands. http://www.nluug.nl/events/sane2000/papers/pawlowski.pdf.

* cited by examiner

*Primary Examiner*—John E Breene
*Assistant Examiner*—Aleksandr Kerzhner
(74) *Attorney, Agent, or Firm*—Yee & Associates, P.C.; Matthew W. Baca (57) ABSTRACT

A method, apparatus, and computer usable code to manage data requests in a file system. A file access request is received from a client data processing system for a file access operation on a file in the file system. A determination is made as to whether the entry is present for the client in response to receiving the file access request. An open request is sent to the file system to open the file in response to the entry being absent. A cookie is received from the file system in response to sending the open request. An entry is created for the client and file with the cookie, and the file access request is sent to the file system using the cookie. Subsequent file access requests are sent to the file system using the same cookie in response to the entry being present.

28 Claims, 4 Drawing Sheets

```
                                    600
                                    ↙
       struct topen_struct {
602 ↘ struct topen_struct   *next;     */ next entry in hash or free list */
604 ↘ struct topen_struct   *prev;     */ prev entry in hash list */
606 ↘ struct socket         *sop;      */ used to distinguish b/w clients */
608 ↙ vnode_t               *vp;       */ held vnode ref */
610 ↙ caddr_t               vinfop;    */ ptr returned on open of PFS */
612 ↙ int                   hold_cnt;  */ hold count on this topen struct */
      int                   o_flags;   */ FREAD or FWRITE */
                                                          ↘614
      time_t                acc_time;  */ last access time */
                      616 ↩
      };
```

FIG. 6

METHOD AND APPARATUS FOR MANAGING MULTI-STREAM INPUT/OUTPUT REQUESTS IN A NETWORK FILE SERVER

BACKGROUND OF THE INVENTION

1. Field of the Invention

The present invention relates generally to an improved data processing system and in particular to a method and apparatus for managing requests to access data. Still more particularly, the present invention relates to a computer implemented method, apparatus, and computer usable program product for managing access to files in a network file system.

2. Description of the Related Art

Data is typically stored in the form of files on the file system. The file system provides a directory structure for tracking files in the path's syntax necessary to access these files. Further, a file system also defines the way files are named as well as a maximum file for volume size. A network file system is a file system that supports access to files from remote clients. These types of file systems may employ various protocols to allow multiple clients to access the same file system from remote devices. One example of such a protocol is network file system version 3 protocol specification found in RFC1813, June 1995.

One feature present in a file system to achieve higher performance for sequential input/output operations include a technique such as read ahead. Read ahead is employed when a process sequentially reads data from the same file. When multiple processes are present that perform sequential input/output operations on the same file at the same time, some file systems can still achieve this type of performance by tracking the sequential nature of the input/output operations on a per application basis. This type of tracking is performed by independent opens performed by the different processes on a data processing system.

However, in the case of a network file system server, the opens performed by the processes on client data processing systems are not propagated to the file system on the server because this type of open is not part of the protocol between the client and server. As a result, when more than one client performs sequential input/output operations on the same file on the server at the same time, the sequential nature of the input/output operations are not detected by the file system. Instead, these type of operations from the different clients on the same file appear to be random and the performance benefit with features, such as read ahead, is lost.

SUMMARY OF THE INVENTION

The present invention provides a method, apparatus, and computer usable code to manage data requests in a file system. A file access request is received from a client data processing system for a file access operation on a file in the file system. A determination is made as to whether the entry is present for the client in response to receiving the file access request. An open request is sent to the file system to open the file in response to the entry being absent. A cookie is received from the file system in response to sending the open request. An entry is created for the client and file with the cookie, and the file access request is sent to the file system using the cookie. Subsequent file access requests are sent to the file system using the same cookie in response to the entry being present.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
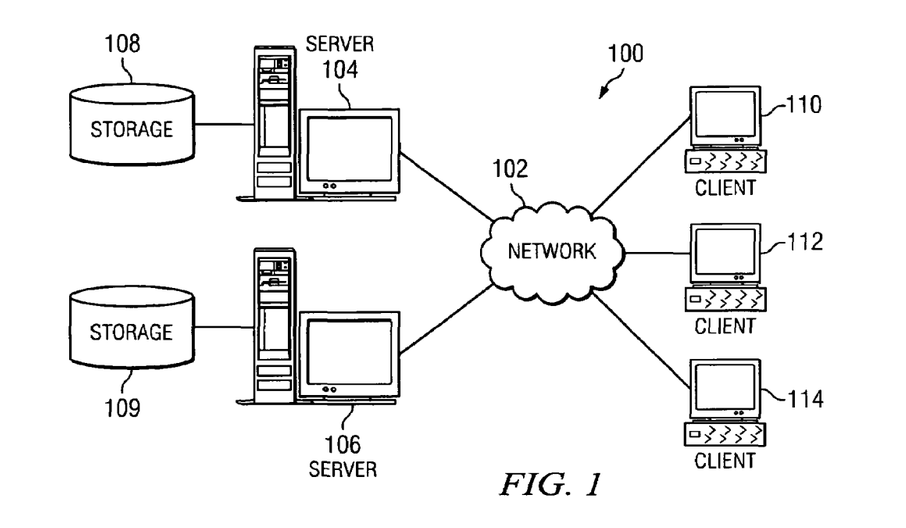
FIG. 1 is a pictorial representation of a network of data processing systems in which aspects of the present invention may be implemented.
Figure 2:
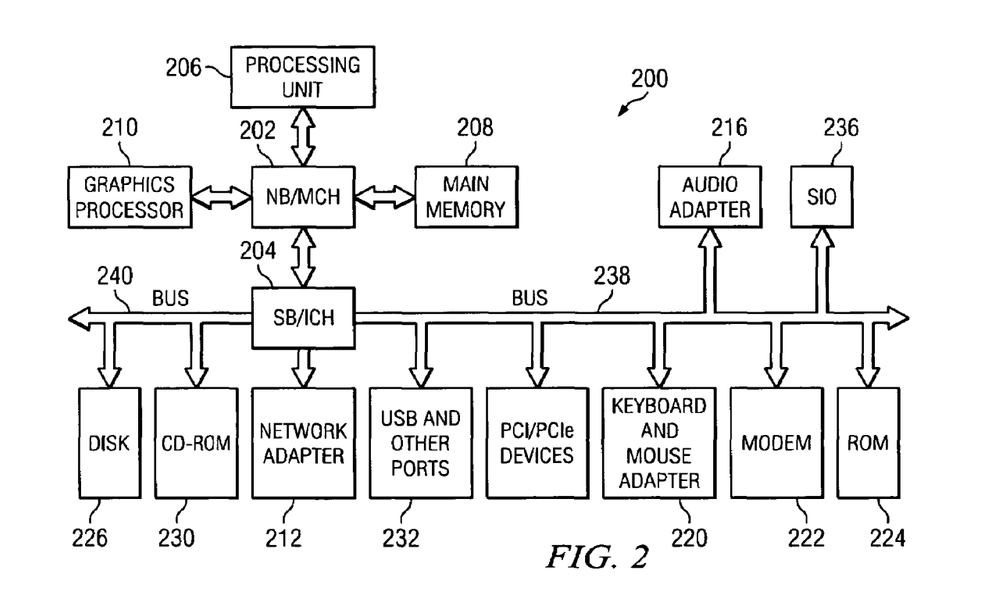
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102. In addition, clients 110, 112, and 114 connect to network 102. These clients 110, 112, and 114 may be, for example, personal computers or network computers. In the depicted example, servers 104 and 106 provide data, such as boot files, operating system images, and applications to clients 110, 112, and 114. Clients 110, 112, and 114 are clients to servers 104 and 106 in this example. In this example, servers 104 and 106 provide access to storage 108 and 109. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and input/output controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and input/output controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and input/output controller hub 204 through bus 240. Hard disk drive 226 and CD-ROM drive 230 may use, for example, an integrated drive electronics (IDE) or serial advanced technology attachment (SATA) interface. Super input/output (SIO) device 236 may be connected to south bridge and input/output controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pseries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer usable program code to enhance the performance of multi-stream input/output operations for a network file system server. A network file system is file system in which access to files are provided to remote data processing systems. A network file system server is a process on a data processing system containing the network file system in a network. The server processes requests to perform operations on files in the network file system.

In these illustrative examples, when a server receives a request from a client for a file access operation, the server performs an open of the file identified in the request. A file access operation is an operation to access a file, such as a read or write operation. When the server performs this open operation on the network file system, a cookie is returned by the physical file system for each open. This physical file system is exported by the network file server and also is referred to as a underlying file system. The network file system includes the file system and the server in these examples. This cookie is not returned to the client computer. Instead, the server maintains the cookie in a logical table that maps a given client and the file to the cookie. On input/output operations on this file, the server looks up the client to find the cookie for the particular client. If the cookie is found, this information is passed on to the underlying file system with the input/output request. As a result, the underlying file system is able to track sequential input/output operations with this information.

If a cookie is not found when the logical table is searched, the file is opened and a new entry is created in the table. Thereafter, the client's request for the input/output operation is sent to the underlying file system. The aspects of the present invention also provide for removing entries that expire after some amount of time of inactivity. Associated files are then closed on the underlying file system on behalf of the client to free up resources in the file system as well as the cookie state traced by the network file server.

In this manner, the remote input/output operations from different clients appear the same as multiple processes running logically on the server. As a result, the underlying file system can detect a sequentiality of input/output operations on a per client basis to achieve a higher performance of sequential input/output operations. The mechanism of the present invention differentiates between clients in the form of client data processing systems, rather than individual client processes in these illustrative embodiments. If it is determined that the additional steps required to lookup entries in a hash table would not enhance or speed up input/output operations, this particular process is not used and the typical passing of requests to network server file systems is performed. In these illustrative examples, the process is only used if the file is greater than a certain size, such as ten megabytes. If the file is too small, this process is not helpful and may slow down the actual performance of input/output operations.

Figure 3:
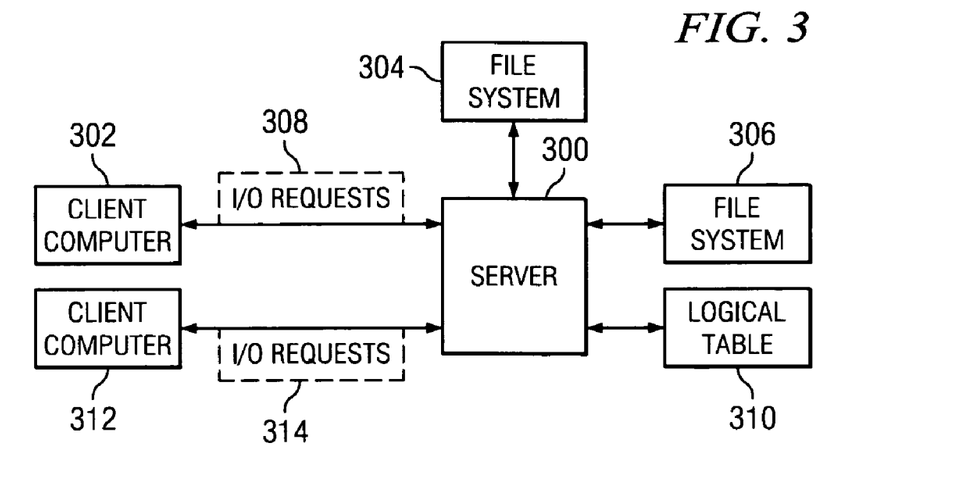
FIG. 3 is a diagram illustrating components used in providing multi-stream input/output operations in a network file system in accordance with an illustrative embodiment of the present invention.

With reference next to FIG. 3, a diagram illustrating components used in providing multi-stream input/output operations in a network file system is depicted in accordance with an illustrative embodiment of the present invention.

In this example, server 300 is a server process that processes requests from clients, such as client computer 302. In these examples, the requests are for input/output operations, such as read and write operations on files. In processing these requests, server 300 receives a request from client computer 302 and sends the request to a network file system. In these examples, server 300 handles requests for file system 304 and file system 306. These file systems are network file systems located on the same data processing system as server 300 in these examples. Client computer 302 may be implemented using a data processing system such as data processing system 200 in FIG. 2. Server 300 also may be implemented using a similar data processing system configured for use as a server. In these illustrative examples, server 300 and file systems 304 and 306 may be implemented using AIX.

In particular, client computer 302 sends input/output requests 308 to server 300 to perform input/output operations on files located in file system 304 or file system 306. Server 300 creates entries within a data structure, such as logical table 310 to provide a mechanism to allow network file systems 304 and 306 to track sequential input/output requests from remote clients, such as client computer 302. In these examples, the input/output requests are tracked on a per client basis rather than a per process or software component basis. Server 300 obtains and tracks cookies returned by file systems 304 and 306.

The protocol between client computer 302 and server 300 does not require propagation of these cookies to client computer 302. As a result, this mechanism is transparent to the processes on client computer 302.

Each one of input/output requests 308 received by server 300 is examined to see whether the particular client and file requested within a request has an entry present in logical table 310. If an entry is present, the cookie is sent with the input/output request to the appropriate underlying file system. In this manner, file systems 304 and 306 are able to identify and track sequential input/output requests from client computer 302.

In a similar manner, server 300 provides access to client computer 312 making input/output requests 314. When client computer 312 makes input/output requests, server 300 performs the same types of processes with respect to client computer 302. If both client 312, and client 302 make requests for the same file in file system 306, file system 306 is able to determine whether sequential input/output requests are occurring because server 300 tracks the cookies returned by file system 306 for client computer 312 and client computer 302. This situation allows for multi-stream input/output for more than one client in which sequential input/output requests can be identified by file system 306.

With this ability, higher performance is enabled through different techniques, such as read ahead from read operations. The different aspects of the present invention only involve processes on server 300. File systems 304 and 306, and client computer 302 require no changes to their software components.

Figure 4:
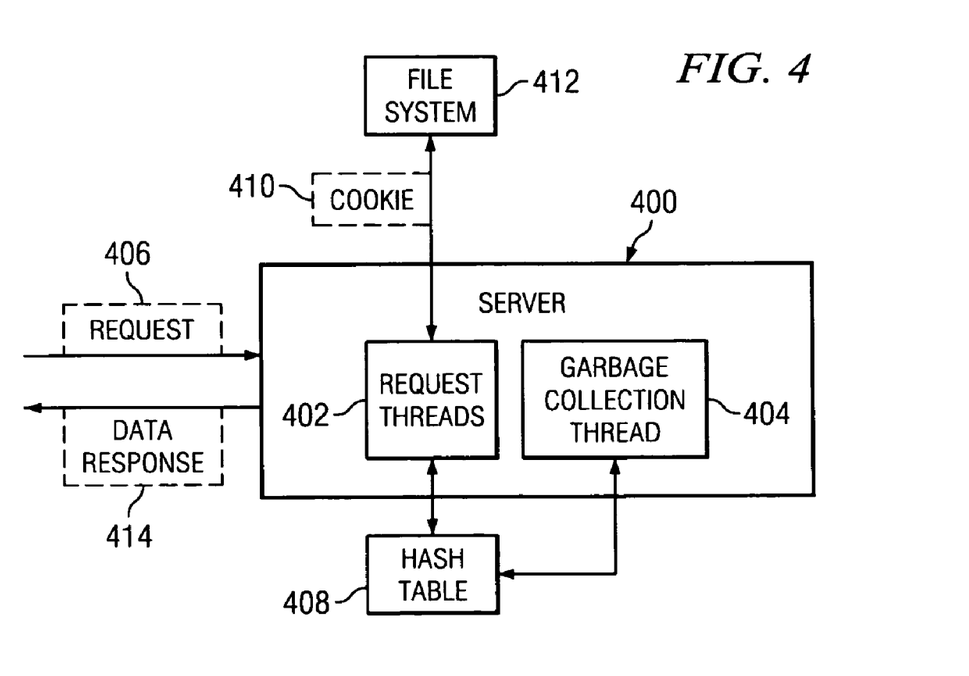
FIG. 4 is a diagram illustrating components used by a server to handle input/output requests in accordance with an illustrative embodiment of the present invention.

Turning now to FIG. 4, a diagram illustrating components used by a server to handle input/output requests is depicted in accordance with an illustrative embodiment of the present invention. In this example, server 400 is a more detailed example of server 300 in FIG. 3. Server 400 includes request threads 402 and garbage collection thread 404. Request threads 402 handle input/output requests from a client, such as client computer 302 in FIG. 3.

When a request, such as request 406 is received, one of request threads 402 handles this request. The particular request thread within request threads 402 looks up the client and file requested in a data structure, such as hash table 408. In these examples, the hash table is used as the fundamental data structure for maintaining entries used to track information about clients for sequential input/output operations.

Request threads 402 determine whether an entry is present within hash table 408 from request 406. If an entry is present, a cookie, such as cookie 410 is retrieved from the entry and passed with the request to file system 412. File system 412 is a file system, such as file system 306 in FIG. 3. This file system uses the cookie to determine whether sequential input/output operations are accruing.

If an entry is not present within hash table 408, the request thread in request threads 402 sends an open request to file system 412. As a result, the cookie, such as cookie 410 is returned. This cookie is placed into an entry created within hash table 408 for the client. Thereafter, a request is made for the input/output operation in request 406 with cookie 410 being sent with the request to file system 412. The data return is sent back to the client computer in data response 414.

Figure 5:
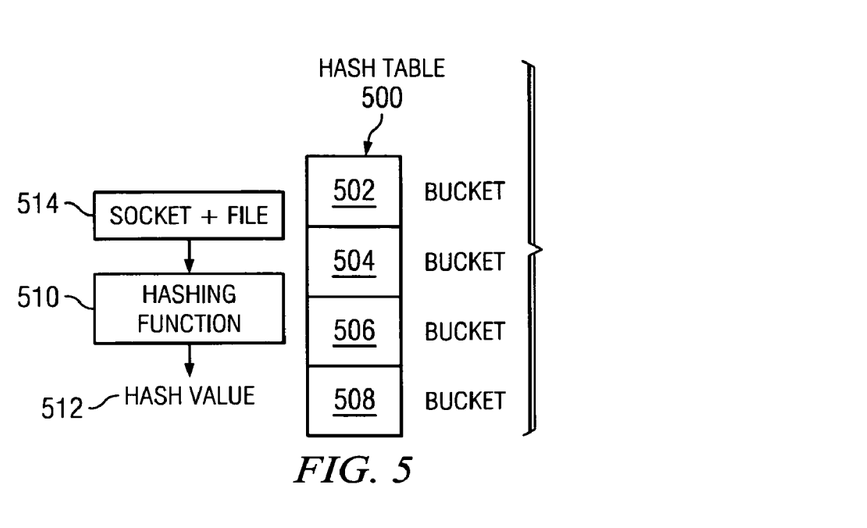
FIG. 5 is a diagram illustrative a data structure and the components used to access a data structure in accordance with an illustrative embodiment of the present invention.

Turning next to FIG. 5, a diagram illustrative a data structure and the components used to access a data structure is depicted in accordance with an illustrative embodiment of the present invention. In this example, hash table 500 is a hash table, such as hash table 408 in FIG. 4. A hash table is a lookup table that is designed to officially store non contiguous keys that may have wide gaps in their alphabetic and numeric sequences. Hash tables are created by using a hashing function or algorithm to hash keys into hash buckets. Each bucket contains a list of key value pairs. Different keys may hash into the same bucket.

In this example, hash table 500 contains buckets 502, 504, 506, and 508. Hashing function 510 is used to generate hash value 512 from socket and file 514. The socket in this example is the client identifier. Each client accesses the server through a particular socket. The file is the file for which an input/output operation has been requested. Hashing function hashes these two components to identify particular bucket from hash table 510 in which a temporary open data structure may be found containing information, such as a cookie associated with a client. The socket pointer is unique for each client and the file is a vnode pointer which is unique for each file.

Hash collisions are handled in hash table 500 by linking colliding temporary open data structures together within the same bucket. In these examples, a read operation for a file by a client is considered a different operation from a write operation for the same file in client for the purpose of tracking sequential input/output operations. As a result, entries for these two operations are found in the same bucket. The linking of these data structures in the same bucket allow for quick handling of hash collisions. With the linking of these structures, a quick lookup is made possible at the time of a request to see if a given client and file already have an entry with the temporary open data structure containing the cookie.

Further, each time one of the entries in hash table 500 are accessed, the access time is updated. If a temporary open data structure does not exist, that means an entry for the client and file is not present within hash table 500. As described above, the server process opens the file on behalf of the client and obtains a cookie, which is returned on the open by the file system. This cookie is stored in an allocated entry containing the temporary open data structure. The cookie is then used on that input/output request and subsequent input/output operations for the same client and file.

The aspects of the present invention also provide a garbage collection process to clean up entries that are not being actively used within hash table 500. At any time, an entry that is older than some period of time is considered expired and is removed from hash table 500. The file is then closed by the server process on behalf of the client and the temporary open structure is returned to a free pool for reuse.

Further, a hold may be placed on a particular structure during the occurrence of an input/output operation to prevent expiration of the entry while that entry is in use. The hold is released when the input/output operation completes.

Figure 6:
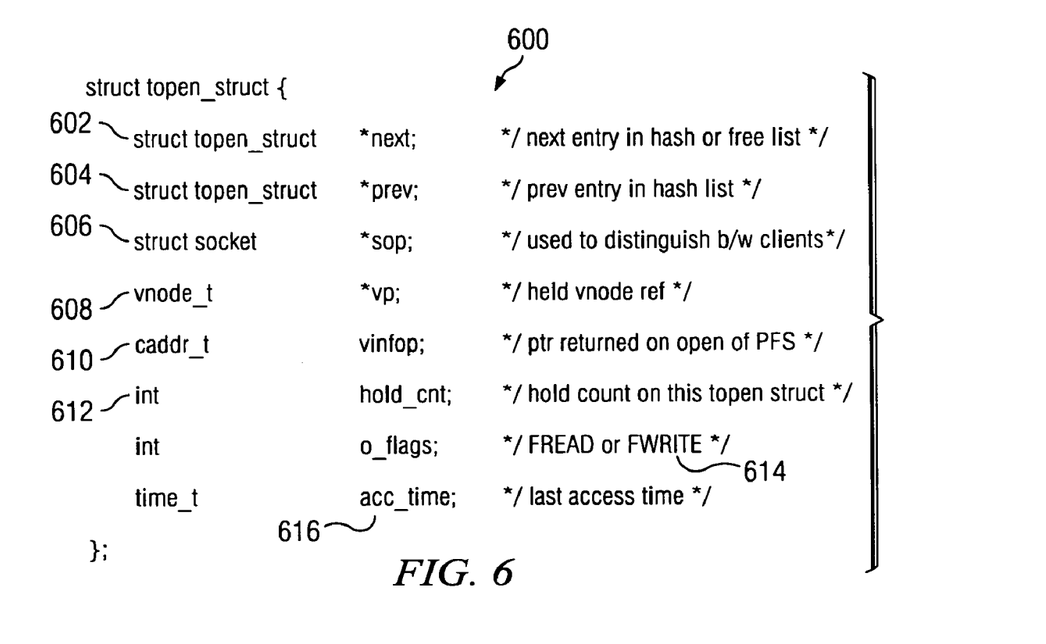
FIG. 6 is a diagram illustrative a temporary open data structure in accordance with an illustrative embodiment of the present invention.

Turning now to FIG. 6, a diagram illustrating a temporary open data structure is depicted in accordance with an illustrative embodiment of the present invention. Temporary open 600 is an example of a temporary open data structure that is used in a hash table, such as hash table 500 in FIG. 5.

Temporary open data structures, such as temporary open 600 are maintained in a hash table with a linked list of other temporary open instructions for each hash bucket. For example, line 602 points to a next temporary open data structure in the hash table or on a free list. If temporary open 600 is not being used, the pointer in line 602 points to another entry within the free list of temporary open data structures. Line 604 points to a previous entry in a hash list. The values on line 602 and 604 are null if no other entries are present in a bucket.

Line 606 is an identification of the socket through which the client is sending input/output requests. This information is used to distinguish between clients. Line 608 contains a vnode identification, which is a pointer to the particular file for which the request has been made. Line 608 is used as a file identifier. Line 610 contains the cookie returned by the physical file system. Line 612 is used as a temporary hold on temporary open 600 when an input/output operation is accruing. This temporary hold prevents temporary open 600 from being returned to a free list of temporary open data structures when an input/output operation is accruing. This hold is removed once the input/output operation has finished.

Line 614 is used to identify whether the operation is a read or write operation. A separate entry is maintained for read operations from the same client for the same file with respect to write operations for the same client and file.

Line 616 is a last access time field, which is updated each time an input/output operation is requested by the client. This last access time is used during garbage collection operations to determine whether an entry should be removed from the hash table.

Figure 7:
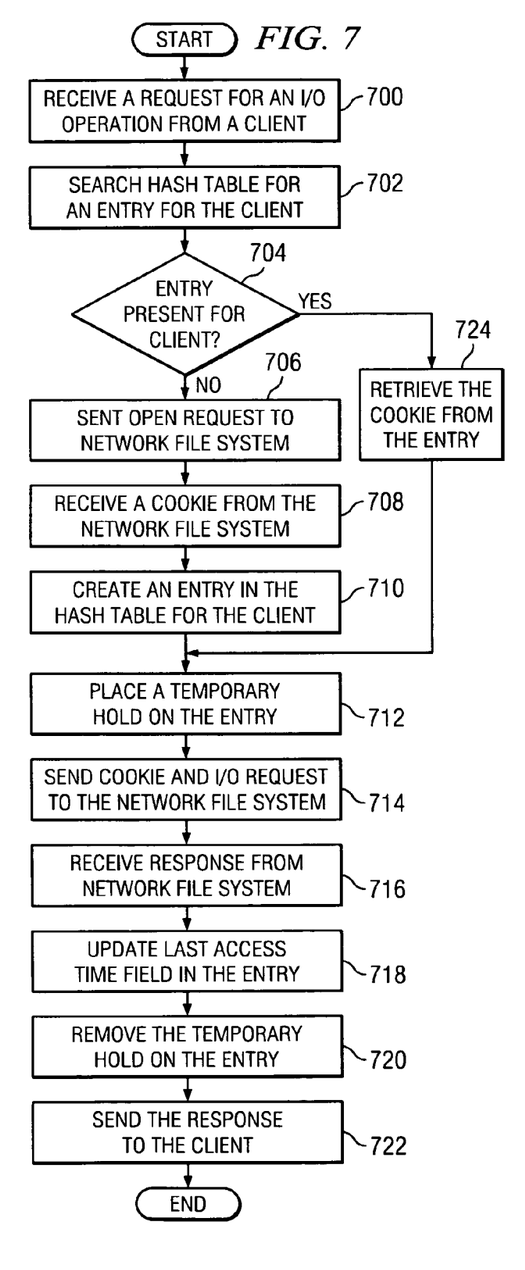
FIG. 7 is a flowchart of a process for handling requests for input/output operations in accordance with an illustrative embodiment of the present invention.

Turning now to FIG. 7, a flowchart of a process for handling requests for input/output operations is depicted in accordance with an illustrative embodiment of the present invention. The process illustrated in FIG. 7 may be implemented in a thread such as threads found in request threads 402 in FIG. 4. The process in FIG. 7 may not be employed every time a request for a file occurs depending on the particular implementation. For example, this process may be implemented only when the access is for a file over a certain file size. Of course, depending on the implementation, this process may be used for every request for an input/output operation.

The process begins by receiving a request for an input/output (I/O) operation from a client (step 700). This request may be, for example, a read or write operation. The process searches a hash table for an entry for the client (step 702). This search is made in a hash table, such as hash table 500 in FIG. 5. The hash table contains entries with data structures, such as temporary open 600 in FIG. 6. The identification of the client is a socket pointer in these examples. The file identification is a vnode.

Next, a determination is made as to whether an entry is present for the client (step 704). If an entry is not present, the process sends an open request to the file system (step 706). The process receives a cookie from the file system in response to the open (step 708). An entry is created in the hash table for the client (step 710). The process then places a temporary hold on the entry (step 712), and sends the returned cookie and the input/output request to the file system (step 714).

Thereafter, the process receives a response from the file system (step 716). The process updates a last access time field in the entry (step 718). In these examples, this last access time field is found in a temporary open structure, such as temporary open structure 600 in FIG. 6. The temporary hold is removed from the entry (step 720), and a response is sent to the client (step 722) with the process terminating thereafter.

With reference again the step 704, if an entry is present for the client, the process retrieves the cookie from the entry in the hash table (step 724) with the process then proceeding to step 712 as described above.

Figure 8:
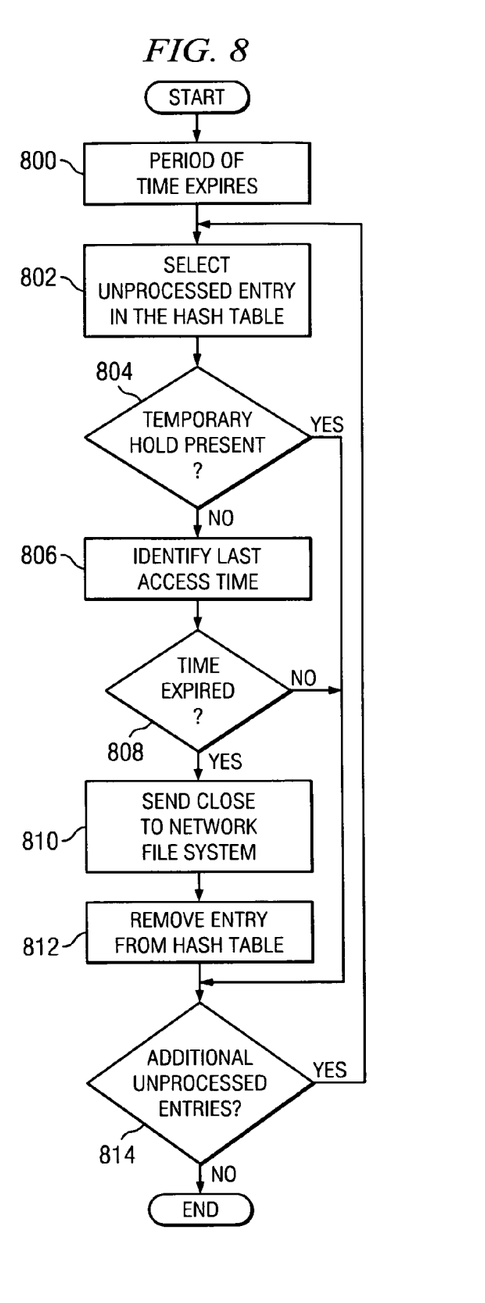
FIG. 8 is a flowchart of a garbage collection process in accordance with an illustrative embodiment of the present invention.

Turning next to FIG. 8, a flowchart of a garbage collection process is depicted in accordance with an illustrative embodiment of the present invention. The process illustrated in FIG. 8 may be implemented in a garbage collection thread, such as garbage collection thread 404 in FIG. 4.

The process begins by a period of time expiring (step 800). This period of time is a time after which the process is initiated to remove entries from the hash table, which have expired. For example, if entries are considered to have expired after three seconds has passed without an access, the period of time may be set for two seconds. The process selects an unprocessed entry from the hash table (step 802). Next, a determination is made as to whether a temporary hold is present on the selected entry (step 804). If a temporary hold is not present on a selected entry, the process identifies a last access time on the entry (step 806). In these examples, the entries are temporary open structures, such as temporary open 600 in FIG. 6.

Afterwards, a determination is made as to whether the entry has expired (step 808). The life of an entry varies depending on the particular implementation. If the entry has expired, the process sends a close for the file to the file system (step 810). Thereafter, the process removes the entry from the hash table (step 812). In removing the entry in step 812, the temporary open structure is returned to a pool of temporary open structures. Next, a determination is made as to whether additional unprocessed entries are present (step 814). If additional unprocessed entries are present, the process returns to step 802. Otherwise, the process terminates.

In this manner, the aspects of the present invention provide a computer implemented method, apparatus, and computer usable program code for improving multi-stream input/output performance in a network file system. The aspects of the present invention associate a client and a file to each open of the file in a data structure. When input/output operations occur, the association is looked up to track sequential input/output operations on a per client basis. The aspects of the present invention can be extended to tracking sequential access for different processes on a particular client. In this type of implementation, requests sent by processes on a client would include an identifier of the particular process sending the request. Such information may be exchanged based on a client implementation in which the protocol sends this type of information. With this information, the hash table used in these examples may be extended so that the trace can identify processes for the same client and file.

Since cookies currently are not propagated between a file system and a client to the server, the aspects of the present invention allow for the server to track these opens and retain the cookies without requiring the client to handle this type of information. The cookie returned by the file system for each open is maintained in a data structure, such as a hash table. This hash table is used on each input/output request from a client to determine whether the cookie for the particular client and file are present. If the cookie is present for the particular client and file, this cookie is returned to the file system with the request.

In this manner, the file system is able to identify sequential input/output operations for a particular client in the file and enhance the performance through techniques that are designed to enhance sequential input/output operations. With the additional path length and time involved in opening files and performing lookups in a data structure to find a cookie for the file system, the aspects of the present invention are initiated only when the cost of these steps is less than that with not using the processes of the present invention.

In these examples, the aspects of the present invention are initiated when a file is over some threshold size and when the file system is of a type supporting tracking of multi-stream input/output operations. As a result, in situations when multi-stream input/output performance is most likely realized, the aspects of the present invention are implemented.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or input/output devices (including but not limited to keyboards, displays, pointing devices, etc.) can be coupled to the system either directly or through intervening input/output controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing data requests in a file system, the computer implemented method comprising:

receiving a file access request from a client data processing system for a file access operation on a file in the file system, wherein the client data processing system is separate from the file system;

responsive to receiving the file access request, determining whether an entry containing a representation of identifiers of the client and the file is present in a set of entries in a data structure stored in a data processing system file system in a location other than the client and managed by a non-client, wherein data regarding file access to the file system is stored including a last access field containing an indication of a last access of the file by the file system and a temporary hold field containing an indication of a temporary hold on the file;

responsive to the entry being absent from the set of entries in the data structure, sending an open request to the file system to open the file;

receiving a cookie generated by the file system in response to opening the file to form a received cookie; wherein the received cookie associates the client with the file;

creating a new entry in the data structure containing the representation of the client and the file and the received cookie and the last access field and the temporary hold field; and sending the file access request to the file system using the received cookie transparent to the client.

2. The computer implemented method of claim 1 further comprising:

responsive to the entry being present in the data structure, sending the file access request to the file system using a specific cookie associated with the entry; and updating the last access field to indicate a recent access.

3. The computer implemented method of claim 2 further comprising:

receiving results from the file access request to form received results; and sending the received results to the client data processing system.

4. The computer implemented method of claim 2, wherein the new entry is created with the received cookie based on the client data processing system, file, and a type of file access requested in the file access request.

5. The computer implemented method of claim 2, wherein the new entry is part of the set of entries used to send requests to the file system and further comprising:

examining the last access field in the entry to determine whether the new entry has expired, wherein the last access field identifies when a particular client data processing system associated with the entry last accessed the file; and responsive to the temporary hold field not set, removing the new entry from the set of entries if the new entry has expired.

6. The computer implemented method of claim 1, wherein the data structure is a hash table.

7. The computer implemented method of claim 1, wherein the file system tracks sequential input/output operations for requests from the client data processing system.

8. The computer implemented method of claim 1, wherein the file access request includes an identification of a process on the client data processing system making the file access request and wherein the new entry created for the client and the file also comprises an identification of the process.

9. A computer program product comprising:

a computer usable medium having computer usable program code stored thereon for managing data requests in a file system, the computer program product including:

computer usable program code for receiving a file access request from a client data processing system for a file access operation on a file in the file system;

computer usable program code, responsive to receiving the file access request, for determining whether an entry containing a representation of identifiers of the client and the file is present in a set of entries in a data structure, stored in a data processing system file system in a location other than the client and managed by a non-client wherein data regarding file access to the file system is stored including a last access field containing an indication of a last access of the file in the file system and a temporary hold field containing an indication of a temporary hold on the file;

computer usable program code, responsive to the entry being absent from the set of entries in the data structure, for sending an open request to the file system to open the file;

computer usable program code for receiving a cookie generated by the file system in response to opening the file to form a received cookie, wherein the received cookie associates the client with the file;

computer usable program code for creating a new entry in the data structure containing the representation of identifiers of the client and the file and the received cookie, and the last access field and the temporary hold field; and computer usable program code for sending the file access request to the file system using the received cookie transparent to the client.

10. The computer program product of claim 9 further comprising:

computer usable program code, responsive to the entry being present in the data structure, for sending the file access request to the file system using a specific cookie associated with the entry; and updating the last access field to indicate a recent access.

11. The computer program product of claim 10 further comprising:

computer usable program code for receiving results from the file access request to form received results; and computer usable program code for sending the received results to the client data processing system.

12. The computer program product of claim 10, wherein the new entry is created with the received cookie based on the client data processing system, file, and a type of file access requested in the file access request.

13. The computer program product of claim 10, wherein the new entry is part of a set of entries used to send requests to the file system and further comprising:

computer usable program code for examining the last access field in the entry to determine whether the new entry has expired, wherein the last access field identifies when a particular client data processing system associated with the entry last accessed the file; and computer usable program code responsive to the temporary hold field not set, for removing the new entry from the set of entries if the new entry has expired.

14. The computer program product of claim 9, wherein the data structure is a hash table.

15. The computer program product of claim 9, wherein the file system tracks sequential input/output operations for the client data processing system.

16. The computer program product of claim 9, wherein the file access request includes an identification of a process on the client data processing system making the file access request and wherein the new entry created for the client and the file also comprises an identification of the process.

17. A data processing system for managing data requests in a file system, the data processing system comprising:

a bus;

a communications unit connected to the bus;

a memory connected to the bus;

a processor unit connected to the bus;

first receiving means for receiving a file access request from a client data processing system for a file access operation on a file in the file system;

determining means, responsive to receiving the file access request, for determining whether an entry containing a representation of identifiers of the client and the file is present in a set of entries in a data structure stored in a data processing system file system in a location other than the client and managed by a non-client; wherein data regarding file access to the file system is stored including a last access field containing an indication of a last access of the file in the file system and a temporary hold field containing an indication of a temporary hold on the file;

first sending means, responsive to the entry being absent from the set of entries in the data structure, for sending an open request to the file system to open the file;

second receiving means for receiving a cookie generated by the file system in response to opening the file to form a received cookie, wherein the received cookie associates the client with the file;

creating means for creating a new entry containing the representation of identifiers of the client and the file and the received cookie and the last access field and the temporary hold field; and second sending means for sending the file access request to the file system using the received cookie transparent to the client.

18. The data processing system of claim 17, wherein the sending means are a first and second sending means, and further comprising:

third sending means, responsive to the entry being present, for sending the file access request to the file system using a specific cookie associated with the entry; and updating the last access field to indicate a recent access.

19. The data processing system of claim 18 further comprising:

receiving means for receiving results from the file access request to form received results; and sending means for sending the received results to the client data processing system.

20. The data processing system of claim 18, wherein the new entry is created with the received cookie based on the client data processing system, file, and a type of file access requested in the file access request.

21. The data processing system of claim 18, wherein the new entry is part of a set of entries used to send requests to the file system and further comprising:

examining means for examining the last access field in the entry to determine whether the new entry has expired, wherein the last access field identifies when a particular client data processing system associated with the entry last accessed the file; and responsive to the temporary hold field not set, removing means for removing the new entry from the set of entries if the new entry has expired.

22. A data processing system comprising:

a bus;

a communications unit connected to the bus;

a memory connected to the bus, wherein the storage device includes a set of computer usable program code stored therein; and a processor unit connected to the bus, wherein the processor unit executes the set of computer usable program code to receive a file access request from a client data processing system for a file access operation on a file in the file system; determine whether an entry containing a representation of identifiers of the client and the file is present in a set of entries in a data structure stored in a data processing system file system in a location other than the client and managed by a non-client-in response to receiving the file access request, wherein data regarding file access to the file system is stored, including a last access field containing an indication of a last access of the file in the file system and a temporary hold field containing an indication of a temporary hold on the file; send an open request to the file system to open the file in response to the entry being absent from the set of entries in the data structure; receive a cookie generated by the file system in response to opening the file to form a received cookie, wherein the received cookie associates the client with the file; create a new entry in the data structure for the client and the file and the received cookie, and the last access field and the temporary hold field; and send the file access request to the file system using the received cookie transparent to the client.

23. The data processing system of claim 22, wherein the processor unit further executes the computer usable code to send the file access request to the file system using a specific cookie associated with the entry in response to the entry being present; and updating the last access field to indicate a recent access.

24. The data processing system of claim 23, wherein the processor unit further executes the computer usable code to receive results from the file access request to form received results; and send the received results to the client data processing system.

25. The data processing system of claim 23, wherein the new entry is created with the received cookie based on the client data processing system, file, and a type of file access requested in the file access request.

26. The data processing system of claim 23, wherein the processor unit further executes the computer usable code to examine the last access field in the entry to determine whether the new entry has expired, wherein the last access field identifies when a particular client data processing system associated with the entry last accessed the file; and responsive to the temporary hold field not set, remove the new entry from the set of entries if the new entry has expired.

27. The data processing system of claim 22, wherein the data structure is a hash table.

28. The data processing system of claim 22, wherein the file system tracks sequential input/output operations for the client data processing system.

* * * * *